(12) United States Patent
Friman et al.

(10) Patent No.: US 9,661,568 B2
(45) Date of Patent: May 23, 2017

(54) METHOD AND POWER ADAPTATION DEVICE ARRANGED TO ADJUST POWER CONSUMPTION IN A NETWORK NODE

(71) Applicant: TELEFONAKTIEBOLAGET L M ERICSSON (PUBL), Stockholm (SE)

(72) Inventors: Erik Friman, Stockholm (SE); Ralf Bergqvist, Bromma (SE); Johan Rune, Lidingö (SE); Lars Westberg, Enköping (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 51 days.

(21) Appl. No.: 14/437,773

(22) PCT Filed: Oct. 25, 2012

(86) PCT No.: PCT/SE2012/051147
§ 371 (c)(1),
(2) Date: Apr. 22, 2015

(87) PCT Pub. No.: WO2014/065725
PCT Pub. Date: May 1, 2014

(65) Prior Publication Data
US 2015/0296451 A1    Oct. 15, 2015

(51) Int. Cl.
*H04W 4/00* (2009.01)
*H04W 52/02* (2009.01)
(Continued)

(52) U.S. Cl.
CPC ..... *H04W 52/0206* (2013.01); *H04W 52/267* (2013.01); *H04W 52/52* (2013.01); *Y02B 60/50* (2013.01)

(58) Field of Classification Search
CPC .......... H04W 52/0206; H04W 52/267; H04W 52/52; Y02B 60/50
(Continued)

(56) References Cited

U.S. PATENT DOCUMENTS

| 6,584,330 B1 * | 6/2003 | Ruuska ............. H04W 52/0206 455/423 |
| 2005/0043053 A1 * | 2/2005 | Lin ........................ H04W 24/00 455/522 |

(Continued)

FOREIGN PATENT DOCUMENTS

| EP | 2107847 A1 | 10/2009 |
| EP | 2501202 A1 | 9/2012 |

*Primary Examiner* — Mong-Thuy Tran
(74) *Attorney, Agent, or Firm* — Patents on Demand P.A.; Brian K. Buchheit; Scott M. Garrett

(57) ABSTRACT

A method is presented for adjusting power consumption in a network node of a cellular communication system. The method is performed in a power adaption device and comprises the steps of aggregating bitrates for all traffic flows associated with a power amplifier of the network node to an aggregated bitrate, determining when to adjust power consumption by determining whether power consumption of the power amplifier can be reduced with acceptable effect on the traffic flows associated with the power amplifier, and adjusting power consumption by reducing power consumption of the power amplifier when it is determined that the power consumption of the power amplifier can be reduced with acceptable effect on the traffic flows associated with the power amplifier. A corresponding power adaptation device is also presented.

26 Claims, 3 Drawing Sheets

(51) Int. Cl.
*H04W 52/26* (2009.01)
*H04W 52/52* (2009.01)

(58) Field of Classification Search
USPC .......................... 455/422.1, 13.4, 522, 127.1
See application file for complete search history.

(56) References Cited

U.S. PATENT DOCUMENTS

| | | | |
|---|---|---|---|
| 2006/0046668 A1* | 3/2006 | Uratani | H03F 1/0205 455/127.5 |
| 2007/0153726 A1* | 7/2007 | Bar-Sade | H04L 1/0002 370/329 |
| 2008/0127258 A1* | 5/2008 | Walker | H04N 7/163 725/39 |
| 2011/0026575 A1* | 2/2011 | Shalom | H04B 3/32 375/227 |
| 2012/0249347 A1* | 10/2012 | Rival | H04J 3/1682 341/100 |
| 2013/0077491 A1* | 3/2013 | Cherian | H04W 28/10 370/235 |

* cited by examiner

METHOD AND POWER ADAPTATION DEVICE ARRANGED TO ADJUST POWER CONSUMPTION IN A NETWORK NODE

This application is a 371 of International Application PCT/SE2012/051147, filed Oct. 25, 2012, the disclosure of which is fully incorporated herein by reference.

TECHNICAL FIELD

The invention relates to a method and power adaptation device arranged to adjust power consumption in a network node.

BACKGROUND

Cellular networks require a significant amount of energy to operate properly. For example, network nodes, such as radio base stations, require energy for processing and transmitting signals to wireless terminals, as well as energy to process incoming signals from the wireless terminals.

It is desired to reduce energy consumption in general, and in particular to reduce energy consumption in network nodes.

WO 2011/034476 presents an arrangement in a radio base station for handling data traffic within a cell of the radio base station, which radio base station is comprised in a telecommunications network. The arrangement comprises a determining unit arranged to determine a maximum power, which maximum power indicates available power to radio base station. In addition, the arrangement comprises a comparing unit arranged to compare the maximum power to a threshold power value, and a handling unit arranged to handle data traffic served by the radio base station according to a shaper rule when the maximum power is below the first threshold power value. The shaper rule is defined to handle data traffic in such a way that an amount of data traffic transmitted over a time period is reduced consuming less power of the radio base station than if the data traffic is handled according to a basic rule when the maximum power is above the threshold power value.

The presented solution controls power consumption by restricting the amount of data traffic. It would be beneficial if there were to be some way to reduce power consumption in an improved and more direct way.

SUMMARY

According to a first aspect, it is presented a method for adjusting power consumption in a network node of a cellular communication system. The method is performed in a power adaption device and comprises the steps of: aggregating bitrates for all traffic flows associated with a power amplifier of the network node to an aggregated bitrate; determining when power consumption of the power amplifier can be reduced with acceptable effect on the traffic flows associated with the power amplifier; and adjusting power consumption by reducing power consumption of the power amplifier when it is determined that the power consumption of the power amplifier can be reduced with acceptable effect on the traffic flows associated with the power amplifier. By adjusting the power consumption in dependence on current aggregated bitrate for a power amplifier, each power amplifier can be adjusted separately and with more granularity than a pure on/off control. Moreover, the power consumption is adjusted for the power amplifier itself, rather than indirect control.

The step of adjusting power consumption may comprise reducing a bias of the power amplifier. The bias is an effective way to reduce the power consumption of the power amplifier while keeping the gain.

The step of determining whether power consumption of the power amplifier can be reduced may comprise: determining a supported bitrate for the power amplifier; and comparing the aggregated bitrate with the supported bitrate. The step of adjusting power consumption may then comprise reducing power consumption based on a difference between the aggregated bitrate and the supported bitrate.

The step of aggregating bitrates may comprise the steps of: identifying a service type of the traffic flows associated with the power amplifier; predicting future bitrate for each one of the traffic flows based on the respectively identified service type and aggregating the predicted future bitrates to be the aggregated bitrate. Each service type, e.g. VoIP, streaming video, streaming audio, software download, web traffic, or peer to peer traffic, has its own characteristics in terms of uniformity/burstiness, bandwidth requirements, etc. Hence by knowing the service type, future bitrates can be predicted better.

The step of identifying (42) service type may comprise determining a delay tolerance for each traffic flow; and the step of comparing (35) the aggregated bitrate may comprise determining a supported bitrate which is throttled, covering all traffic flows which are not delay tolerant, but not covering all delay tolerant flows.

The method may further comprise the step of: determining a safety margin for the reduced power consumption. The step of adjusting power may then comprise reducing the power with consideration to the safety margin.

The step of determining a safety margin may comprise: determining the safety margin based on a delay tolerance for each one of the traffic flows associated with the power amplifier.

The step of determining a safety margin may comprise: determining the safety margin based on how reliable the prediction of aggregated bitrates is.

In the step of adjusting power consumption, the power consumption is optionally only reduced when it is determined that the power consumption of the power amplifier can be reduced with acceptable effect on the traffic flows associated with the power amplifier, for longer than a threshold duration. In other words, the adjustment is only effected if it is persistent.

In the step of adjusting power consumption, the power consumption is optionally only reduced when the reduction is greater than a threshold value. In other words, the adjustment is only effected if it is significant.

The method may further comprise the step of: adjusting power consumption by deactivating at least one signal processing circuit associated with the traffic flows associated with the power amplifier. For example, the signal processing circuits can be DSPs. The signal processing circuits also use power and by deactivating unused signal processing circuits, even more power can be saved.

The step of adjusting power consumption by deactivating at least one signal processing circuit may comprise deactivating at least one signal processor forming part of receiver circuitry. Signal processing circuits also use power for the uplink, and by deactivating unused signal processing circuits in the uplink, even more power can be saved.

The method may be further applied correspondingly to another power amplifier of the same or different network node than the network node associated with the power amplifier.

The step of determining may comprise determining to adjust power consumption by determining when the power consumption is to be increased to improve a user experience. In that case, the step of adjusting power consumption comprises adjusting the power consumption by increasing power consumption of the power amplifier when it is determined that the power consumption is to be increased to improve a user experience. By allowing a power increase when needed, full control (i.e. both decrease and increase) of the power consumption is provided based on the traffic flows.

According to a second aspect, it is presented a power adaptation device arranged to adjust power consumption in a network node of a cellular communication system. The power adaptation device comprises: a processor; and a computer program product storing instructions that, when executed by the processor, causes the power adaptation device to: aggregate bitrates for all traffic flows associated with a power amplifier of the network node; determine when power consumption of the power amplifier can be reduced with acceptable effect on the traffic flows associated with the power amplifier; and adjust power consumption by reducing power consumption of the power amplifier when it is determined that the power consumption of the power amplifier can be reduced with acceptable effect on the traffic flows associated with the power amplifier.

The instructions to adjust power consumption may comprise instructions to reduce a bias of the power amplifier.

The instructions to determine whether power consumption of the power amplifier can be reduced may comprise instructions to: determine a supported bitrate by the power amplifier; and compare the aggregated bitrate with the supported bitrate. The instructions to adjust power consumption may then comprise instructions to reduce power consumption based on a difference between the aggregated bitrate and the supported bitrate.

The instructions to aggregate bitrates may comprise the instructions to: identify a service type of the traffic flows associated with the power amplifier; predict future bitrate for each one of the traffic flows based on the respectively identified service type and aggregate the predicted future bitrates to be the aggregated bitrate.

The instructions to identify service type may comprise instructions to determine a delay tolerance for each traffic flow; and the instructions to compare the aggregated bitrate may comprise instructions to determine a supported bitrate which is throttled, covering all traffic flows which are not delay tolerant, but not covering all delay tolerant flows.

The power adaptation device may further comprise the instructions to: determine a safety margin for the reduced power consumption. The instructions to adjust power may then comprise reducing the power with consideration to the safety margin.

The instructions to determine a safety margin may comprise instructions to determine the safety margin based on a delay tolerance for each one of the traffic flows associated with the power amplifier.

The instructions to determine a safety margin may comprise instructions to determine the safety margin based on how reliable the prediction of aggregated bitrates is.

The instructions to adjust power consumption may comprise instructions to only reduce the power consumption when it is determined that the power consumption of the power amplifier can be reduced with acceptable effect on the traffic flows associated with the power amplifier for longer than a threshold duration.

The instructions to adjust power consumption may comprise instructions to only reduce the power consumption when the reduction is greater than a threshold value.

The power adaptation device may further comprise instructions to: adjust power consumption by deactivating at least one signal processing circuit associated with the traffic flows associated with the power amplifier.

The instructions to adjust power consumption by deactivating at least one signal processing circuit may comprise instructions to deactivate at least one signal processor forming part of receiver circuitry.

The instructions may be further applied correspondingly for at least another power amplifier of the same or different network node than the network node associated with the power amplifier.

The instructions to determine may comprise instructions to determine to adjust power consumption by determining when the power consumption is to be increased to improve a user experience. In that case, the instructions to adjust power consumption comprises instructions to adjust the power consumption by increasing power consumption of the power amplifier when it is determined that the power consumption is to be increased to improve a user experience.

It is to be noted that the term aggregate when used in the description and the claims herein is to be interpreted as the sum of or (when in verb form) to sum up.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIG. 5 is a schematic diagram illustrating some components of one embodiment of a radio access network controller of FIG. 1.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
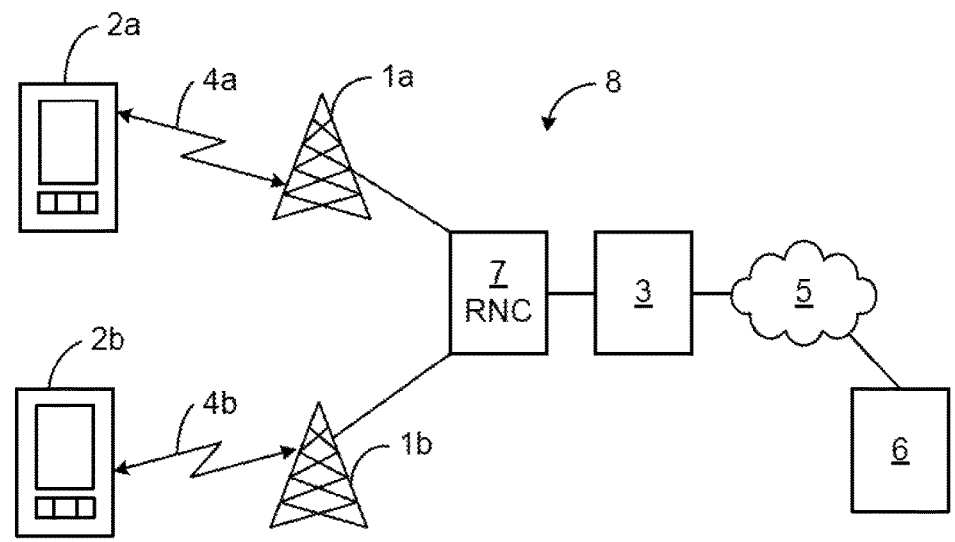
FIG. 1 is a schematic diagram illustrating an environment where embodiments presented herein can be applied.

FIG. 1 is a schematic diagram illustrating a cellular network 8 where embodiments presented herein may be applied. The cellular network 8 comprises a core network 3 and a plurality of network nodes 1a-b, in this example two. The network nodes 1a-b can be radio base stations in the form of evolved Node Bs, also known as eNodeBs or eNBs. The network nodes 1a-b could also be in the form of Node Bs, BTSs (Base Transceiver Stations) and/or BSSs (Base Station Subsystems), etc. The network nodes 1a-b provide radio connectivity to a plurality of wireless terminals 2a-b. Optionally, one or more of the network nodes 1a-b can comprise a remote radio unit comprising antenna, etc. for the actual radio interface.

The term wireless terminal is also known as mobile communication terminal, user equipment, mobile terminal, user terminal, user agent, machine-to-machine devices etc., and can be, for example, what today are commonly known as a mobile phone or a tablet/laptop with wireless connectivity or fixed mounted terminal. Moreover, the wireless terminals 2 may but do not need to, be associated with a particular end user.

The cellular network 8 may e.g. comply with any one or a combination of LTE-SAE (Long Term Evolution-System Architecture Evolution), W-CDMA (Wideband Code Division Multiple Access), EDGE (Enhanced Data Rates for GSM (Global System for Mobile communication) Evolution), GPRS (General Packet Radio Service), CDMA2000 (Code Division Multiple Access 2000), WiMAX (Worldwide Interoperability for Microwave Access) or any other current or future wireless network, such as LTE-Advanced, as long as the principles described hereinafter are applicable.

Uplink communication (from the wireless terminals 2a-b) and downlink communication (to the wireless terminals 2a-b) between each wireless terminal 2a-b and the network nodes 1a-b occur over respective wireless radio interfaces 4a-b. The quality of the wireless radio interface 4a-b to each wireless terminal 2a-b can vary over time and depending on the position of the wireless terminal 2a-b, due to effects such as fading, multipath propagation, etc. Transmission power in power amplifiers of the network nodes 1a-b for downlink communication is adjusted according to the radio conditions.

The network nodes 1 are also connected, optionally via a radio access network controller 7, such as a Radio Network Controller, RNC, to the core network 3 for connectivity to central functions and a wide area network 5, such as the Internet. One or more content servers 6 are also connected to the wide area network 5. In this way, the wireless terminal 2 can request content, such as video, audio, web content, software download, etc., from the content servers 6.

Optionally, there is one or more network caches (not shown) arranged to cache content to speed up response times and reduce network traffic.

Figure 2:
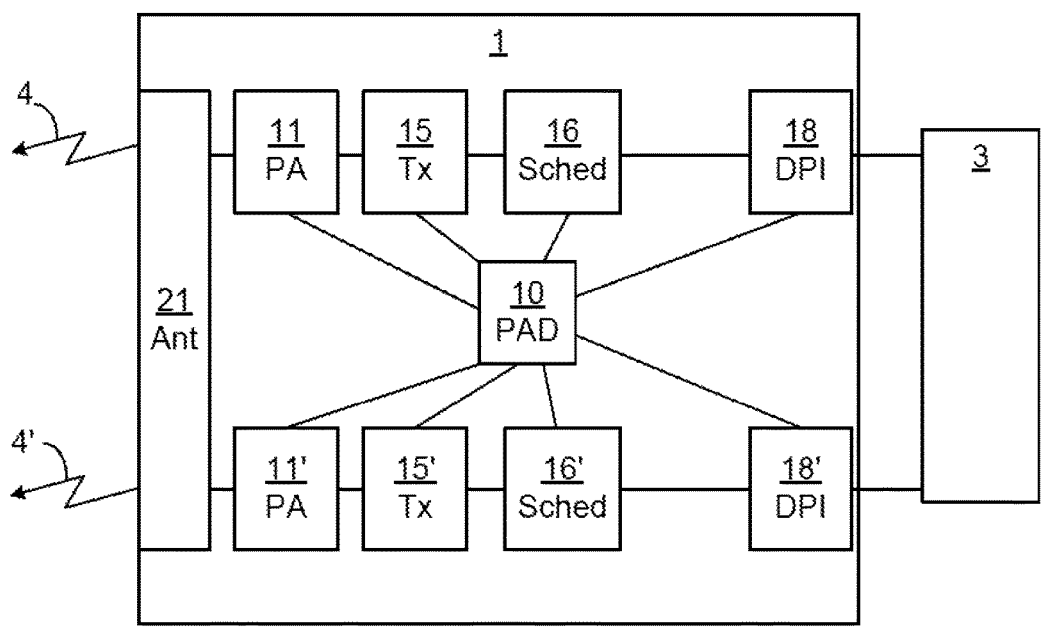
FIG. 2 is a schematic diagram illustrating how a power adaption device can be used in relation to one of the network nodes of FIG. 1.

FIG. 2 is a schematic diagram illustrating how a power adaption device can be used in relation to a network node 1 of FIG. 1. The network node 1 here represents any one of the network nodes 1a-b of the cellular network 8 in FIG. 1.

On one end, the network node 1 is connected, directly or via an intermediate radio access network controller (not shown) to the core network 3. On the other end, the network node 1 is connected to zero or more wireless terminals via wireless radio interfaces 4-4'.

Looking at the upper part of the network node 1 in FIG. 2, related to a first power amplifier 11, there is an antenna 21, first transmitter circuitry is, a first scheduler 16 and a first deep packet inspection device 18.

The antenna 21 is any suitable antenna for transmitting, and optionally also for receiving, radio signals to and/or from wireless terminals. For example, the antenna 21 can be a single antenna or it may comprise a number of antenna elements in an antenna array.

The first transmitter circuitry is comprises suitable digital and analogue components to transform a digital input signal to an analogue signal which the antenna 21 can transmit. For example, the first transmitter circuitry 15 can comprise a number of signal processing circuits, such as Digital Signal Processors (DSPs), for digital signal processing prior to a digital to analogue conversion which also occurs in the first transmitter circuitry 15.

The first scheduler 16 is responsible for scheduling traffic to any connected wireless terminals within the current constraints. The first scheduler 16 can consider various priorities and/or quality of service (QoS) parameters to prioritise certain traffic flows over others. For example, a traffic flow related to a Voice over Internet Protocol (VoIP) is more sensitive to delays than a software download and should be prioritised. The extent to which traffic can be delayed depends on buffer sizes and how long the packets of the traffic flow are deemed valid when received by the wireless device. Moreover, the first scheduler 16 can accept signals for traffic shaping, i.e. a maximum throughput for traffic flows associated with the first power amplifier 11.

An optional first deep packet inspection device 18 performs deep packet inspection on the data to be transmitted, which can be used when determining whether to adjust power consumption by the first power amplifier 11.

Analogously, for a second power amplifier 11', there is the antenna 21 (shared with the components associated with the first power amplifier 11), second transmitter circuitry 15', a second scheduler 16' and a second deep packet inspection device 18'. Optionally, the first and second deep packet inspection devices 18-18' can be combined in a single deep packet inspection device.

There is also a power adaptation device 10, connected to the power amplifiers 11-11', the transmitter circuitries 15-15', the schedulers 16-16' and the deep packet inspection devices 18-18'.

Each power amplifier 11-11' is associated with zero or more downlink traffic flows, and provides suitable power amplification, depending on the radio characteristics at the time for the wireless terminals receiving the signals for the downlink traffic flows.

According to embodiments presented herein, the power consumption of the power amplifier 11-11' and/or the transmission circuitry 15-15' can be adjusted depending on the characteristics of the downlink traffic flows. A rudimentary form of traffic flow characteristics can be obtained by monitoring the traffic flows and calculating their combined, aggregated bitrate. More detailed characteristics can e.g. be obtained in the deep packet inspection devices 18-18' and analysed by the power adaptation device 10. For example, if there is a very low combined throughput of downlink traffic flows for the first power amplifier, a bias of the first power amplifier 11 can be reduced without negatively affecting the traffic flows for the first power amplifier. This determination can be done separately for the first and second power amplifiers 11-11'.

Figure 3:
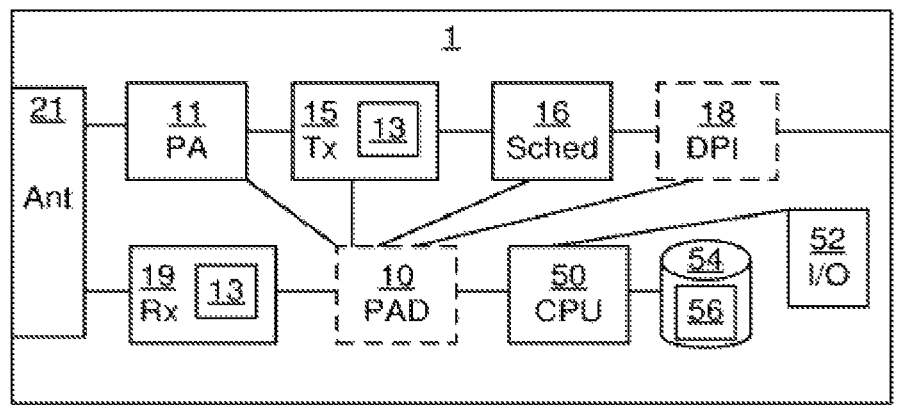
FIG. 3 is a schematic diagram illustrating some components of one embodiment of one of the network nodes of FIG. 1.

FIG. 3 is a schematic diagram illustrating some components of one embodiment of the network nodes of FIG. 1. Many of the components of FIG. 2 are also shown here and will not be explained again.

The transmitter circuitry 15 comprises a plurality of signal processing circuits 13, such as Digital Signal Processors (DSPs). Each signal processing circuit is associated with a number of tasks, and can be associated to zero, one or more downlink traffic flows. As will be explained in more detail below, if determined possible for a particular signal processing circuit, e.g. if there are zero downlink traffic flows associated with the signal processing circuit, it can be deactivated to save power. Deactivation can e.g. comprise turning off the signal processing circuit or setting the signal processing circuit in an idle mode. It is to be noted that signal processing circuits may also be comprised in a pool of signal processing circuits, which can be dynamically shared between traffic flows associated different instances of transmitter circuitry and or receiver circuitry.

Analogously the network node also comprises receiver circuitry 19 which comprises a plurality of signal processing circuits 13, such as Digital Signal Processors (DSPs). Each signal processing circuit is associated with a number of tasks, and can be associated to zero, one or more uplink traffic flows. Also here, if determined possible for a particular signal processing circuit, e.g. if there are zero uplink traffic flows associated with the signal processing circuit, it can be deactivated to save power.

The power adaption device 10 is optionally provided in the network node itself 1. Alternatively, the power adaption device is provided in another device, such as the radio access network controller, which is then in contact with the network node 1 to determine any adjustment and output signals to effect the power adjustment.

A processor 50 is provided using any combination of one or more of a suitable central processing unit (CPU), multi-processor, microcontroller, digital signal processor (DSP), application specific integrated circuit etc., capable of executing software instructions contained in a computer program 56 stored in a computer program product 54, e.g. in the form of a memory. The processor 50 can optionally be configured to execute the functions of the power adaptation device 10 by executing the computer program 56.

The computer program product 54 is here a memory being any combination of read-and-write memory (RAM) and read-only memory (ROM). The memory also comprises persistent storage, which, for example, can be any single one or combination of magnetic memory, optical memory, solid state memory or even remotely mounted memory. The processor 50 controls the general operation of the network node 1.

The network node 1 further comprises an I/O interface 52 for communicating with external entities, such as the core network or optionally a radio access network controller.

Most components shown of the network node 1 can be provided in more than one unit. For example, there can be a plurality of antennas 21, a plurality of power amplifiers 11, a plurality of signal processing circuits 13 of the transmitter 15, a plurality of schedulers 16, a plurality of signal processing circuits 13 of the receiver 19, a plurality of processors 50, etc.

Figure 4A:
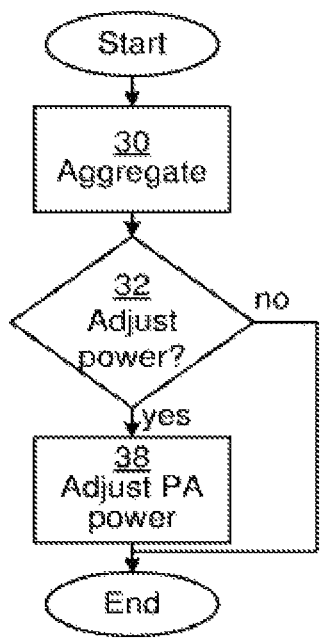
FIGS. 4A-B are flow charts illustrating methods performed in a network node of FIG. 1.
Figure 4B:
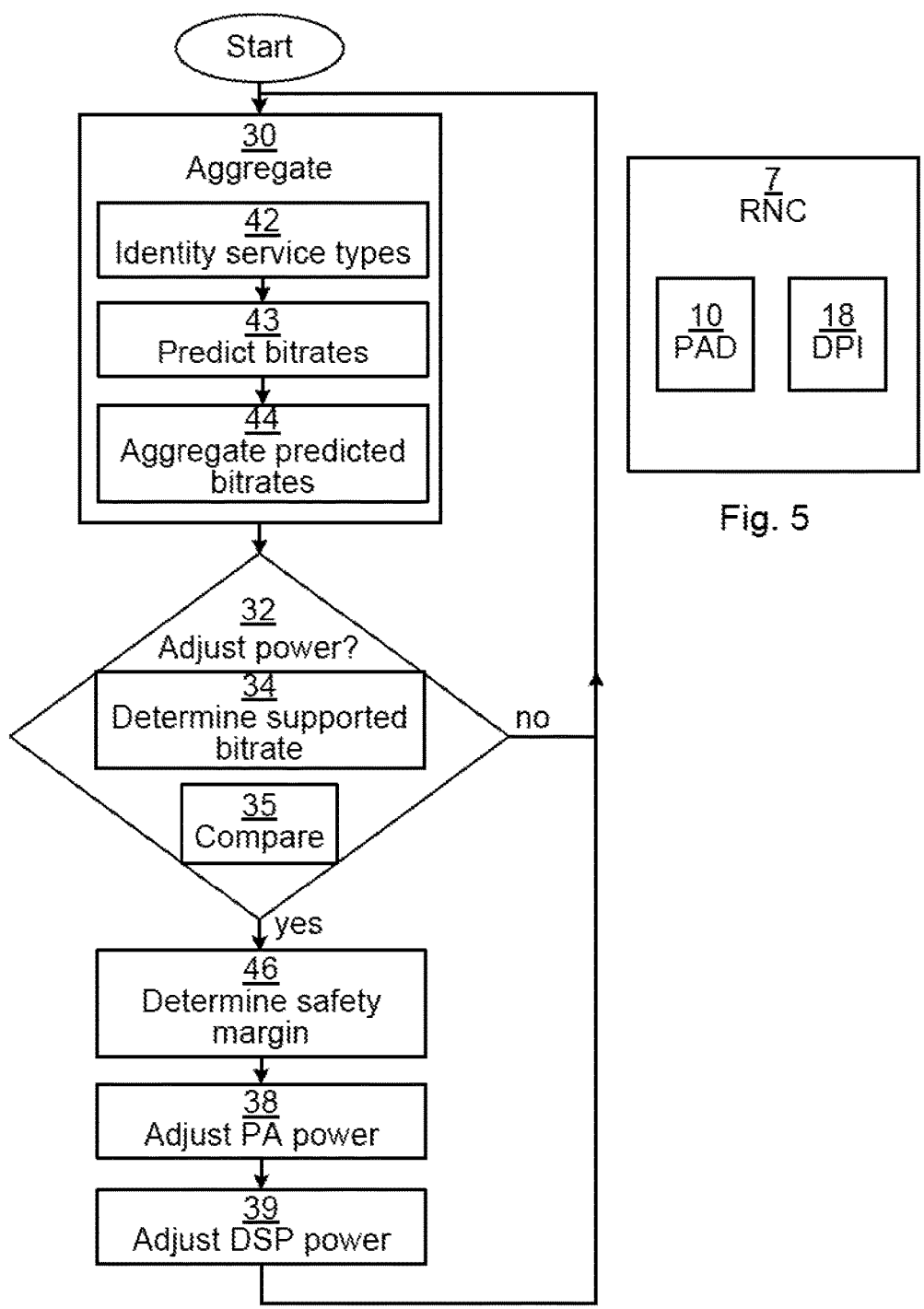

FIGS. 4A-B are flow charts illustrating methods performed in a network node of FIG. 1. The methods relate to adjusting power consumption in any one or more of the network nodes of FIGS. 1-3, and is performed in the power adaption device 10 of FIGS. 2, 3 and 5. The methods relate to resources associated with one power amplifier of the network node. Several instances of the methods can execute simultaneously, where each instance is associated with its own, separate, power amplifier. The methods can e.g. be performed each time a new application session starts, a session ends, when a new traffic flow starts (e.g. identified by a 5-tuple consisting of source address, destination address, protocol number in the IP packet header, source port number and destination port number in the transport protocol packet header) or a traffic flow ends. Alternatively or additionally, the methods can be performed periodically.

The method illustrated in FIG. 4A will now be explained first.

In an initial aggregate step 30, bitrates for all traffic flows associated with a power amplifier of the network node are aggregated to an aggregated bitrate. The traffic flows can comprise voice traffic and/or data traffic.

In a conditional adjust power step 32, it is determined if power consumption of the power amplifier needs to be adjusted. In a first case, this condition can be determined by evaluating whether the power consumption can be reduced with acceptable effect on the traffic flows which are associated with the power amplifier. If this is the case, the method continues to an adjust PA power step 38; otherwise, the method ends. In a second case, this condition can be determined by evaluating whether the power consumption needs to be increased to improve a user experience. For example, the power consumption should be increased if the supported bitrate by the current power consumption is not sufficient to transmit all delay sensitive traffic. Acceptable is here to be interpreted as having an acceptable effect for the end user. The exact definition of acceptable could optionally be configured by the operator of the cellular network 8.

In the adjust PA power step 38, power consumption is reduced in accordance with the conditional adjust power step 32. If it is determined to reduce the power consumption, the power consumption of the power amplifier is reduced. Also, a traffic shaper signal can be sent to the scheduler. The traffic shaper signal sets a maximum throughput which restricts throughput for traffic flows for the power amplifier, to the indicated maximum throughput. This can even out variations in traffic throughput over time, where less delay sensitive traffic flows can be delayed by the scheduler.

The power consumption reduction of the power amplifier in question can be effected by reducing a bias of the power amplifier. This maintains the gain of the power amplifier but will have the effect of reduction the throughput supported by the power amplifier.

On the other hand, if the conditional adjust power step 32 determined that the power consumption needs to be increased, the power consumption of the power amplifier can be increased, e.g. by increasing bias of the power amplifier. In that case, the maximum throughput may be increased by sending a traffic shaper signal to the scheduler with the new maximum throughput.

Optionally, the power consumption is only adjusted when it is determined for that the power consumption of the power amplifier should be adjusted to a level that may be maintained for longer than a threshold duration (such as a number of seconds). In other words, the adjustment is only effected if it is persistent.

Optionally, the power consumption is only adjusted when the adjustment is greater than a threshold value. In other words, the adjustment is only effected if it is significant.

The reason for the two optional procedures mentioned above is that it can take time for a power amplifier to re-bias and stabilise to a new power level, which can have temporary negative effect on performance.

FIG. 4B is similar, but not identical, to FIG. 4A. The steps which are described with reference to FIG. 4A will not be explained here again unless there is a difference between the methods with regard to the particular step.

Here, the aggregate step 30 comprises three sub-steps: an identify service types step 42, a predict bitrates step 43 and an aggregate predicted bitrates step 44.

In the identify service types step 42, the service type of the traffic flows associated with the power amplifier are identified. This can be achieved using deep packet inspection (DPI), by inspecting headers and optionally payload of packets of the traffic flows (and optionally traffic characteristics like e.g. burstiness), such as using the DPI device of FIGS. 2 and 3. For instance, the DPI can classify each traffic flow to be any one of the following service types: VoIP, streaming video, streaming audio, software download, web traffic, peer to peer traffic or any other type. Note that when identifying a service, it is also possible, e.g. using DPI, to analyse service signalling and meta information, e.g. to derive the current stage of a signalling procedure, e.g. during a SIP (Session Initiation Protocol) session establishment, or derive the size of a video clip that is about to be streamed or the size of a file that is about to be downloaded. Signalling analysis may also aid in determining how sensitive a service flow is to certain properties of the communication, e.g. delays, jitter or bitrate throttling.

In the predict bitrates step 43, future bitrates for each one of the traffic flows are predicted based on the respectively identified service type. Optionally, further information is derived about the service flows, as described above.

In the aggregate predicted bitrates step 44, the predicted future bitrates are aggregated to be the aggregated bitrate. Moreover, the aggregated bitrate can be determined to be a throttled bitrate, covering all delay sensitive traffic flows, but not all delay tolerant traffic flows. In this way, delay sensitive traffic is not affected by the throttling, but only delay tolerant traffic. The delay sensitivity/tolerance can be based on the service type for the respective traffic flow, as well as further information about the concerned service flows which may be derived, e.g. from DPI and signalling analysis, as described above.

The conditional adjust power step 32 here comprises two sub-steps: a determine supported bitrate step 34 and a compare step 35.

In the determine supported bitrate step 34, a supported bitrate is determined for the power amplifier. This can depend on the current load level of the power amplifier. The supported bitrate also depends on the current radio environment. If, for example, the radio conditions are very poor to the connected wireless terminals, more power is needed for transmissions than when the radio conditions are good. This implies that the supported bitrate is lower when radio conditions to the wireless terminals are poor. Moreover, the supported bitrate can be determined to be a throttled bitrate, covering all delay sensitive traffic flows, but not all delay tolerant traffic flows. In this way, delay sensitive traffic is not affected by the throttling, but only delay tolerant traffic. The delay sensitivity/tolerance can be based on the service type for the respective traffic flow, as well as further information about the concerned service flows which may be derived, e.g. from DPI and signalling analysis, as described above. The prioritisation of the delay sensitive traffic is effected e.g. in the scheduler, as explained above. For example, if there are two traffic flows, one with VoIP and one with software download, the supported bitrate can be determined to cover the VoIP traffic but not necessarily the software download (or assuming a low bitrate for the software download), at that particular point in time. Since the delay sensitive VoIP traffic is not affected, the effect of the adjusted traffic flows is negligible (and thereby acceptable) to an end user.

In the compare step 35, the aggregated bitrate is compared with the supported bitrate.

Before the adjust PA power step 38, there is here a determine safety margin step 46. In this step, a safety margin is determined for the reduced power consumption.

In one embodiment, the safety margin is determined based on a delay tolerance for each one of the traffic flows associated with the power amplifier. In one extreme example, if all traffic has the service type VoIP, the delay tolerance is poor, and the safety margin is set such that any risk is low that the traffic flows are not being allocated their desired throughput. In another extreme example, if all traffic has the service type software download, the safety margin does not need to be as strict, as a delay may not matter to the end user. In a situation where there is a mixture of traffic for the power amplifier, existing solutions for priorities in scheduling (such as QoS) helps to prioritise delay sensitive traffic.

In one embodiment, the safety margin is determined based on how reliable the prediction of aggregated bitrates is. This can be based on service type. For example, for web traffic, the prediction is less reliable than audio streaming. The reliability of prediction is combined for all traffic flows of the power amplifier. When the prediction is reliable, the safety margin can be smaller.

In the adjust PA power step 38, power consumption is reduced or increased based on a difference between the aggregated bitrate and the supported bitrate.

When a safety margin has been determined in the determine safety margin step 46, the safety margin is considered when adjusting the PA power.

In an optional adjust signal processing circuit power step 39, power consumption is reduced by deactivating at least one signal processing circuit associated with the traffic flows associated with the power amplifier. A signal processing circuit can be deactivated e.g. when there are zero downlink traffic flows associated with the signal processing circuit or when it may be derived from the prediction steps (i.e. the predict bitrates step 43 and the aggregate predicted bitrates step 44) that the combined signal processing circuit capacity may be reduced for some time.

Optionally, one or more signal processing circuits forming part of receiver circuitry, associated with uplink processing can also be deactivated when they are not required, e.g. when no traffic flows are associated with them or when it can be derived from the prediction steps 43, 44 that a combined signal processing circuit capacity for reception processing may be reduced for some time. When a signal processing circuit that has been deactivated is needed again, it is activated to support greater throughput.

After the adjust signal processing circuit power step 39, the method starts over again, optionally after period of waiting.

FIG. 5 is a schematic diagram illustrating some components of one embodiment of a radio access network controller 7 of FIG. 1. In this embodiment, the power adaptation device 10 and the deep packet inspector device 18 is comprised in the radio access network controller 7. Other components of the radio access network controller 7 are omitted in order not to obscure the embodiments presented herein.

The invention has mainly been described above with reference to a few embodiments, which mainly describe the proposed solutions as being located in a single type of node, such as a base station or a radio access network controller, or with parts of the solution components located in a base station and other parts in a radio access network controller.

However, it should be emphasized that the inventive solution may be embodied in manners in which the solution components are divided in various (other) ways between different network nodes.

For instance, the aggregation of bitrates, prediction and shaping may be located in a radio access network controller and the PA power adjustment in the base station. In another example the aggregation of bitrates, prediction and shaping are performed in by one or more core network nodes, such as a gateway node (e.g. a Packet Data Network Gateway or a Serving Gateway in an Evolved Packet System network or a General Packet Radio Service (GPRS) Gateway Support Node or a Serving GPRS Support Node in a Universal Mobile Telecommunication System network), wherein the one or more core network nodes communicate with the radio access network node(s), e.g. a base station and/or a radio access network controller, where the PA power adjustment takes place.

In yet another example, the aggregation of bitrates and prediction are performed by one or more core network nodes, the shaping is performed by a radio access network controller and the PA power adjustment is performed by a radio access network controller or a base station, possibly based on instructions from the radio access network controller. In a further example the aggregation of bitrates and prediction are performed by one or more core network nodes and the shaping and PA power adjustment are handled by a base station. In a further example the aggregation of bitrates and prediction are located in a radio access network controller and shaping and PA power adjustment are located in the base station. Further variations of distribution of solution components between different network nodes are also conceivable, as is readily appreciated by a person skilled in the art.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for adjusting power consumption in a network node of a cellular communication system, the method being performed in a power adaption device and comprising the steps of:
aggregating bitrates for all traffic flows associated with a power amplifier of the network node to an aggregated bitrate;
determining when to adjust power consumption by determining whether power consumption of the power amplifier can be reduced with acceptable effect on the traffic flows associated with the power amplifier by:
determining a supported bitrate for the power amplifier; and
comparing the aggregated bitrate with the supported bitrate; and
adjusting power consumption by reducing power consumption of the power amplifier based on a difference between the aggregated bitrate and the supported bitrate when it is determined that the power consumption of the power amplifier can be reduced with acceptable effect on the traffic flows associated with the power amplifier.

2. The method according to claim 1, wherein the step of adjusting power consumption comprises reducing a bias of the power amplifier.

3. The method according to claim 1, wherein the step of aggregating bitrates comprises the steps of:
identifying a service type of the traffic flows associated with the power amplifier;
predicting future bitrate for each one of the traffic flows based on the respectively identified service type; and
aggregating the predicted future bitrates to be the aggregated bitrate.

4. The method according to claim 3, wherein the step of identifying the service type of the traffic flows comprises determining a delay tolerance for each traffic flow, and wherein the step of comparing the aggregated bitrate further comprises determining the supported bitrate which is throttled, covering all traffic flows which are not delay tolerant, but not covering all delay tolerant flows.

5. The method according to claim 3, further comprising the step of:
determining a safety margin for the reduced power consumption; and wherein the step of adjusting power consumption comprises reducing the power with consideration to the safety margin.

6. The method according to claim 5, wherein the step of determining a safety margin comprises determining the safety margin based on a delay tolerance for each one of the traffic flows associated with the power amplifier.

7. The method according to claim 5, wherein the step of determining a safety margin comprises determining the safety margin based on how reliable the prediction of aggregated bitrates is.

8. The method according to claim 1, wherein in the step of adjusting power consumption, the power consumption is only reduced when it is determined that the power consumption of the power amplifier can be reduced with acceptable effect on the traffic flows associated with the power amplifier for longer than a threshold duration.

9. The method according to claim 1, wherein in the step of adjusting power consumption, the power consumption is only reduced when the reduction is greater than a threshold value.

10. The method according to claim 1, further comprising the step of:
adjusting power consumption by deactivating at least one signal processing circuit associated with the traffic flows associated with the power amplifier.

11. The method according to claim 10, wherein the step of adjusting power consumption by deactivating at least one signal processing circuit comprises deactivating at least one signal processor forming part of receiver circuitry.

12. The method according to claim 1, wherein the method is further applied correspondingly to another power amplifier of the same or different network node than the network node associated with the power amplifier.

13. The method according claim 1, wherein:
the step of determining when to adjust power consumption comprises determining to adjust power consumption by determining whether the power consumption is to be increased to improve a user experience; and
the step of adjusting power consumption comprises adjusting the power consumption by increasing power consumption of the power amplifier when it is determined that the power consumption is to be increased to improve a user experience.

14. A power adaptation device arranged to adjust power consumption in a network node of a cellular communication system, the power adaptation device comprising:
a processor; and a computer program product storing instructions that, when executed by the processor, causes the power adaptation device to:
aggregate bitrates for all traffic flows associated with a power amplifier of the network node;
determine when to adjust power consumption by determining whether power consumption of the power amplifier can be reduced with acceptable effect on the traffic flows associated with the power amplifier by:
determining a supported bitrate for the power amplifier; and
comparing the aggregated bitrate with the supported bitrate; and
adjust power consumption by reducing power consumption of the power amplifier based on a difference between the aggregated bitrate and the supported bitrate when it is determined that the power consumption of the power amplifier can be reduced with acceptable effect on the traffic flows associated with the power amplifier.

15. The power adaptation device according to claim 14, wherein the instructions to adjust power consumption comprise instructions to reduce a bias of the power amplifier.

16. The power adaptation device according to claim 14, wherein the instructions to aggregate bitrates comprise instructions to:
identify a service type of the traffic flows associated with the power amplifier;
predict future bitrate for each one of the traffic flows based on the respectively identified service type; and
aggregate the predicted future bitrates to be the aggregated bitrate.

17. The power adaptation device according to claim 16, wherein the instructions to identify the service type of the traffic flows comprise instructions to determine a delay tolerance for each traffic flow, and wherein the instructions to compare the aggregated bitrate comprise instructions to determine a supported bitrate which is throttled, covering all traffic flows which are not delay tolerant, but not covering all delay tolerant flows.

18. The power adaptation device according to claim 16, further comprising instructions to: determine a safety margin for the reduced power consumption, and wherein the instructions to adjust power consumption comprise instructions to reduce the power with consideration to the safety margin.

19. The power adaptation device according to claim 18, wherein the instructions to determine a safety margin comprise instructions to determine the safety margin based on a delay tolerance for each one of the traffic flows associated with the power amplifier.

20. The power adaptation device according to claim 18, wherein the instructions to determine a safety margin comprise instructions to determine the safety margin based on how reliable the prediction of aggregated bitrates is.

21. The power adaptation device according to claim 14, wherein the instructions to adjust power consumption comprise instructions to only reduce the power consumption when it is determined that the power consumption of the power amplifier can be reduced with acceptable effect on the traffic flows associated with the power amplifier for longer than a threshold duration.

22. The power adaptation device according to claim 14, wherein the instructions to adjust power consumption comprise instructions to only reduce the power consumption when the reduction is greater than a threshold value.

23. The power adaptation device according to claim 14, further comprising instructions to adjust power consumption by deactivating at least one signal processing circuit associated with the traffic flows associated with the power amplifier.

24. The power adaptation device according to claim 23, wherein the instructions to adjust power consumption by deactivating at least one signal processing circuit comprise instructions to deactivate at least one signal processor forming part of receiver circuitry.

25. The power adaptation device according to claim 14, wherein the instructions are further applied correspondingly for at least another power amplifier of the same or different network node than the network node associated with the power amplifier.

26. The power adaptation device according to claim 14, wherein:
the instructions to determine when to adjust power consumption comprises instructions to determine to adjust power consumption by determining whether the power consumption is to be increased to improve a user experience; and
the instructions to adjust power consumption comprises instructions to adjust the power consumption by increasing power consumption of the power amplifier when it is determined that the power consumption is to be increased to improve a user experience.

* * * * *